US009292108B2

(12) United States Patent
Ballard et al.

(10) Patent No.: US 9,292,108 B2
(45) Date of Patent: Mar. 22, 2016

(54) SYSTEMS AND METHODS FOR REMOTE MOUSE POINTER MANAGEMENT

(75) Inventors: Lee E. Ballard, Cedar Park, TX (US); Gregory H. Aicklen, Pflugerville, TX (US)

(73) Assignee: Dell Products LP, Round Rock, TX (US)

( * ) Notice: Subject to any disclaimer, the term of this patent is extended or adjusted under 35 U.S.C. 154(b) by 199 days.

(21) Appl. No.: 13/536,565

(22) Filed: Jun. 28, 2012

(65) Prior Publication Data

US 2014/0002361 A1     Jan. 2, 2014

(51) Int. Cl.
    *G06F 3/0354*     (2013.01)

(52) U.S. Cl.
    CPC .... *G06F 3/03543* (2013.01); *G06F 2203/0383* (2013.01)

(58) Field of Classification Search
    USPC .................................................. 345/163–166
    See application file for complete search history.

(56) References Cited

U.S. PATENT DOCUMENTS

| | | | |
|---|---|---|---|
| 4,686,329 A * | 8/1987 | Joyce | 178/19.01 |
| 6,232,932 B1 * | 5/2001 | Thorner | 345/1.3 |
| 6,901,455 B2 | 5/2005 | Gough | |
| 7,213,096 B2 | 5/2007 | Keys et al | |
| 7,426,542 B2 | 9/2008 | Rothman et al. | |
| 7,505,029 B2 | 3/2009 | MacPherson | |
| 7,656,387 B2 | 2/2010 | MacPherson | |
| 7,721,013 B2 | 5/2010 | Diamant | |
| 7,730,205 B2 | 6/2010 | Rothman et al. | |
| 7,986,844 B2 | 7/2011 | Diamant et al. | |
| 2005/0007344 A1 * | 1/2005 | Cook et al. | 345/163 |
| 2006/0190532 A1 | 8/2006 | Chadalavada | |
| 2006/0212143 A1 | 9/2006 | Nguyen et al. | |
| 2007/0085825 A1 | 4/2007 | Geffin et al. | |
| 2009/0079694 A1 | 3/2009 | Day et al. | |
| 2009/0128491 A1 | 5/2009 | Katayama et al. | |
| 2010/0169069 A1 | 7/2010 | Diamant et al. | |
| 2010/0274936 A1 | 10/2010 | Liu | |
| 2011/0078293 A1 | 3/2011 | Phung et al. | |

OTHER PUBLICATIONS

Dell, "Manuals", Using The iKVM Module, Printed from Internet Feb. 28, 2012, 13 pgs.
Synergy, Printed from Internet May 21, 2012, 1 pg.
X.org Foundation, Development/Documentation/Pointer Acceleration, Printed from Internet Jun. 22, 2012, 14 pgs.
Windows Mouse Things, Investigations Into Windows Mouse Behaviour, Printed From Internet Jun. 22, 2012, 7 pgs.

(Continued)

*Primary Examiner* — Alexander Eisen
*Assistant Examiner* — Cory Almeida
(74) *Attorney, Agent, or Firm* — Egan, Peterman, Enders & Huston, LLP

(57) ABSTRACT

Systems and methods are provided that may employ remote system mouse pointer position feedback from video/graphics circuitry (e.g., video adapter hardware such as graphics card, video card, etc.) of a remote information handling system to manage a remote mouse pointer based on local mouse position input received from a user interface of local information handling system that is communicatively coupled to the remote information handling system across a wired or wireless network, e.g., to synchronize a remote mouse pointer with a local mouse pointer that is manipulated by a local user of a local information handling system or to implement a single cursor mode for the remote mouse pointer.

29 Claims, 6 Drawing Sheets

(56) References Cited

OTHER PUBLICATIONS

Pointer Ballistics For Windows XP, Printed from Internet Jun. 22, 2012, 4 pgs.
OKVM, The Open Source KVM And Console Management Site, Printed from Internet Jun. 22, 2012, 2 pgs.
Wikipedia, "Remote Desktop Protocol", Printed from Internet Jun. 22, 2012, 7 pgs.
Raritan, "KVM-Over-IP Benefits In An HP ILO Environment", Printed from Internet Jun. 22, 2012, 4 pgs.
HP Integrated Lights-Out, Data Sheet, Printed from Internet Jun. 22, 2012, 4 pgs.
jHP Integrity Servers, HP Integrity Integrated Lights-Out (ILO), Printed from Internet Jun. 22, 2012, 2 pgs.
Intel, "Absolute vs. Relative Mouse", Printed from Internet Mar. 30, 3012, 1 pg.
Intel, "KVM Application Developers Guide", Printed from Internet Mar. 30, 2012, 1 pg.
Intel, "SDK Resources", Printed from Internet Mar. 30, 2012, 1 pg.
Intel, "KVM Topics", Printed from Internet Mar. 30, 2012, 1 pg.
SDK Resources, "Dealing With A Secondary Display", Printed from Internet Jun. 25, 2012, 1 Pg.
KVM and Intel AMT, Printed from Internet Jun. 25, 2012, 2 pgs.
Richardson et al., "The Remote Framebuffer Protocol", ReadVNC Ltd., Mar. 2011, 37 pgs.
Wikipedia, "Input Device", Mar. 20, 2012, 6 pgs.

* cited by examiner

SYSTEMS AND METHODS FOR REMOTE MOUSE POINTER MANAGEMENT

FIELD OF THE INVENTION

This invention relates generally to information handling systems and, more particularly, to remote mouse management for information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Keyboard, video, mouse over IP (iKVM) is a combination of applications and hardware on a remote computing system that allow a local computing system user to use a local mouse pointer to control a remote pointer on the remote system and, in some cases, iKVM may be provided as an embedded solution on a remote computing system. The local computing system locally displays a remote desktop that corresponds to applications and OS running on the remote system, and the local user controls movement of the local mouse pointer using a local mouse device that provides input to the local system. With conventional iKVM, an attempt is made to synchronize the local mouse pointer with the remote mouse pointer so that when the user moves the local mouse pointer over the remote window displayed on the local desktop, the local mouse pointer moves and operates in the same manner as, or in coordination with, the remote pointer. However, when used with contemporary local operating systems, such as Linux and post-2005 Windows OS, users of conventional iKVM systems typically experience situations where the local mouse pointer and the simultaneously-displayed remote mouse pointer are not in synchronization. In such a case, as the local mouse pointer moves across the remote window displayed on the local desktop, the remote mouse pointer will often move slower or faster than the local mouse pointer and the local mouse device and remote mouse pointer will drift apart. Operating systems use mouse ballistics algorithms (referred to as "enhanced pointer precision" in Windows OS). Operating Systems and video cards have also been employed that use 2D hardware acceleration in the video card to render a mouse pointer.

Using a local iKVM client while experiencing mouse synchronization problems can significantly degrade the user experience, with higher frustration levels and lower productivity being the inevitable result. In many cases, tasks which would be straightforward sitting at the local console become arduous and irritating as the user attempts to make selections and choose actions on a remote host from a console that is remotely located across a network from the remote host.

One conventional way to address the above-described type of iKVM mouse pointer synchronization problem is to provide a special menu with which the user can switch to a "one mouse" or "single cursor" mode. The single cursor mode traps focus in the remote desktop window application displayed on the local desktop viewer and turns off the user's local mouse so that only the remote mouse is displayed. In other words, the local mouse pointer disappears, and the local mouse device movements only affect the remote mouse pointer in the remote desktop window. When in such a single cursor mode, the user must manually bring the local viewer out of the single cursor mode when the user desires to put focus on another application on his desktop. To do this, a user enters a special key combination to get control of the local mouse pointer back, which is disruptive to user productivity, especially in typical server management applications where multiple simultaneous iKVM sessions are commonly implemented under certain scenarios. Additionally since the local viewer application is does not know the position of the remote mouse pointer, many special viewer menus (like viewer config) that key off the mouse touching the top of the screen are disabled.

In another conventional implementation, a user may be allowed to put the iKVM into default Windows or Linux mode, and then perform a mouse reset by pressing a button that forces the remote mouse pointer cursor to top left and snaps the local mouse pointer cursor to the same position. Unfortunately, the default mouse acceleration for Windows and Linux have changed with Windows 7 and also with new Linux distributions. Additionally, the mouse has to be manually synchronized by the user and it loses synchronization over time. Any changes to the mouse acceleration on the remote host will make the issue much worse. There is no feedback of mouse movements so anything that causes the mouse to jump will cause it to immediately go out of synchronization.

In another conventional implementation described in United States Patent Application Publication No. 20070085825, movement of an input device at a first location may be correlated with the movement of a cursor of a remote computer at a second location that is remote from the first location. In particular, the correlation of the virtual movement of a mouse device at a keyboard, video and mouse (KVM) switch may be correlated with at least one acceleration setting associated with the remote computer. The KVM switch may provide to the user a series of prompts (e.g., audio or visual) that specify how the input device is to be moved, and when, so that the user can move the input device in a fashion that will enable the KVM switch to determine the value/s of the configurable movement parameter/s. However, it is not possible to hold perfect local/remote mouse synchronization indefinitely using this technique.

In another conventional implementation, the iKVM emulates a direct input device (like a touch screen) instead of relative input device like a mouse. However, not all applications support direct input devices, and not all operating systems support direct input without a special driver. Moreover, in some cases, system BIOS may not support direct input devices in the UEFI environment.

Agents, such as Microsoft Remote Desktop and some forms of VNC server, may be implemented as agents in the form of modified device drivers that provide mouse position feedback. Using this approach, any process running in the operating system (OS) can simply ask the OS where the mouse is, and the OS will respond with the mouse position. However, such agents depend on the OS and are not compatible with pre-OS operations like changing BIOS settings or installing an OS. Moreover, requiring an additional agent complicates the system installation and requires additional processing power, maintenance updates, etc. Additionally, agent-based solutions present security-related issues by allowing a potential backdoor that might be exploited to compromise the system. With agents, a security issue may occur not on first installation, but may occur with any of the updates that might be installed as part of regular maintenance.

SUMMARY OF THE INVENTION

Disclosed herein are systems and methods that may employ remote system mouse pointer position feedback from video/graphics circuitry (e.g., video adapter hardware such as graphics card, video card, etc.) of a remote information handling system to manage a remote mouse pointer based on local mouse position input received from a user interface of local information handling system that is communicatively coupled to the remote information handling system across a wired or wireless network, e.g., to synchronize a remote mouse pointer with a local mouse pointer that is manipulated by a local user of a local information handling system or to implement the automatic and real-time enablement and disablement of a single cursor mode for the remote mouse pointer.

In one embodiment of the disclosed systems and methods, video adapter hardware circuitry on a remote system may be configured to utilize information from hardware acceleration to provide remote mouse position feedback (e.g., X,Y position) through a host iKVM manager to a VNC client that is executing on a local system and to utilize the real time remote mouse position feedback to correct for any differences between the current remote mouse position and the current local mouse position on the local system to keep the remote mouse pointer in synchronization with the local mouse pointer. In such an exemplary embodiment, the disclosed systems and methods may be so implemented to reduce or substantially eliminate remote and local mouse pointer synchronization problems often experienced using conventional iKVM solutions, and that may be caused by changes in the mouse ballistics algorithms used by a conventional operating system (e.g., such as "enhanced pointer precision" in Windows OS), as well as the inability of the conventional iKVM to detect or adapt to changes in mouse acceleration. In this regard, a conventional mouse pointer input device (e.g., a relative pointing device) is intended to be an input only device, and the conventional OS provides no feedback to the mouse of mouse pointer position movements.

Using the disclosed systems and methods, video adapter hardware circuitry on a remote system may in one exemplary embodiment be configured to receive mouse pointer information from the remote system OS (e.g., via 2d hardware acceleration and VGA driver), and then to provide this mouse pointer location information to a host iKVM manager, e.g., which may be implemented on a remote access controller of the remote system. This may be accomplished at a relatively low level, before the cursor image is combined with the background image and written to the frame buffer. Since it is implemented in this embodiment by the VGA hardware, this technique of providing mouse pointer location information to a host iKVM manager from the VGA hardware may be implemented in an OS-independent manner, i.e., so that it is always performed in the same manner regardless of the OS or application running on top. Therefore, when running a different OS and/or application, a different VGA driver may be used to map that OS or application onto the same VGA hardware function to update the cursor sprite.

Thus, in one exemplary embodiment, a modified VGA adapter firmware may be employed to relay the remote cursor position (e.g., that is always known by the VGA firmware whenever 2d hardware acceleration is used) to the host iKVM manager to allow an embedded local iKVM client to know the current X/Y position of the remote mouse pointer so that the iKVM client may keep the remote mouse pointer in synchronization with the local mouse pointer X/Y position sent to it from the client in an manner that is independent of the operating system, e.g., without requiring any special operating system (Windows or Linux) agent or other software to be installed or otherwise present on the remote information handling system, and even during operating system installation on the remote system. Thus, in such an embodiment, the disclosed systems and methods may be implemented to provide local and remote mouse pointer synchronization for a local iKVM client using an agentless feedback mechanism that tells the iKVM client how the remote host is actually converting mouse ticks sent by the iKVM into remote mouse pointer position. This is in contrast to conventional embedded iKVM solutions that only use connectivity to the video adapter hardware to read the remote system frame buffer for purposes of increasing frame rate.

In another embodiment, the video adapter hardware circuitry on a remote system may be configured to utilize information from hardware acceleration to provide a notification of edge of screen event through a host iKVM manager to an iKVM client that is executing on a local system in order to automatically enable or disable a single cursor mode. In this regard, a single cursor mode may be implemented on a local iKVM client that is controlled based on mouse pointer position feedback information received and monitored by the iKVM client across a wired or wireless network from a remote video adapter. In this embodiment, the single cursor mode may be automatically disabled when it is determined that the remote mouse pointer has hit the edge of the remote system frame (e.g., the determined remote mouse pointer position is no longer within the outer peripheral edge of a remote monitor screen of the displayed remote system frame) and automatically enabled when it is determined that the local pointer cursor has moved into and away from the edge of the remote system frame (e.g., the determined remote mouse pointer position is within the outer peripheral edge of a remote monitor screen of the displayed remote system frame). For example, when an edge event is detected, a notification is sent from the remote system to an enhanced local iKVM client that uses the signal to disable the single cursor mode. The enhanced iKVM client may then track the client mouse position and when it moves over the window displaying the remote system frame (screen) the client may again enable the single cursor mode automatically, without requiring a manual request from a user. This is in contrast to a conventional single cursor mode that requires a user to manually enable and disable the single cursor mode with a special key combination.

In one embodiment, the disclosed systems and method may be implemented in an automatic and fully closed loop manner so that possibility of pointer synchronization failure is substantially eliminated, even when automatic manipulation of the remote cursor is employed (i.e., without a human user in the loop). This is in contrast to those conventional open loop techniques that eventually result in the local and remote pointers loosing synchronization, including conventional single cursor mode solutions that are open loop when automatic manipulation of the remote cursor is desired (i.e., a human is removed from the loop and a "macro processor" attempts to move the remote cursor by simulating mouse movements).

In another embodiment a host iKVM manager may be configured to send the remote mouse cursor information with frame buffer information (i.e., as obtained from video adapter hardware circuitry) to a local iKVM client, and the local iKVM client may then be configured to adjust mouse pointer information it sends back to the host iKVM manager in order to synchronize local and remote mouse pointers.

In one respect, disclosed herein is a system of multiple information handling systems, including: at least one first information handling system configured to operate as a remote host system; and at least one second information handling system coupled to the first information handling system across a network, the second information handling system configured to operate as a local client system. The local client system may itself include: a local user interface including at least one local display device and at least one local mouse pointing device coupled to the local processing device, and at least one local processing device configured to accept local mouse pointer position input from a user of the local mouse pointing device to change the real time position of a local mouse pointer.

The remote host system may itself include: at least one first processing device configured to determine an updated position of a remote system mouse pointer, video/graphics circuitry coupled to the first processing device, the video/graphics circuitry configured to receive the updated position of the remote system mouse pointer from the first processing device and to produce remote system frame buffer information and updated remote system mouse position information representing the updated position of the remote system mouse pointer, and at least one second processing device coupled to the first processing device, the second processing device being configured to receive information across the network from the local processing device of the local client system that represents the real time position of the local system mouse pointer, and provide local system mouse pointer position information to the first processing device based on the received information representative of the real time position of the local system mouse pointer.

The first processing device of the remote host system may be configured to determine the updated position of the remote system mouse pointer based at least in part on the local system mouse pointer position information. The video/graphics circuitry may be configured to provide the remote system frame buffer information and updated remote system mouse position information to the second processing device. The second processing device may be configured to provide an updated remote system frame buffer across the network to the local client system, the updated remote system frame buffer including the updated remote system mouse position. The local processing device may be configured to receive and display updated frame information from the updated remote system frame buffer together with an image of the updated remote system mouse pointer position on the local display device of the local user interface.

In another respect, disclosed herein is a method of operating multiple information handling systems, including providing at least one first information handling system as a remote host system including: at least one first processing device, video/graphics circuitry coupled to the first processing device, and at least one second processing device coupled to the first processing device. The method may further include providing at least one second information handling system as a local client system coupled to the first information handling system across a network, with the second information handling system including: a local user interface including at least one local display device and at least one local mouse pointing device coupled to the local processing device, and at least one local processing device.

The method may also include the steps of: using the local processing device of the local client system to accept local mouse pointer position input from a user of the local mouse pointing device, change the real time position of a local mouse pointer based on the local mouse pointer position input, and provide information across the network to the second processing device of the remote host system that represents the real time position of the local system mouse pointer; using the second processing device of the remote host system to receive the information across the network from the local processing device of the local client system that represents the real time position of the local system mouse pointer, and to provide local system mouse pointer position information to the first processing device of the remote host system based on the received information representative of the real time position of the local system mouse pointer; using the first processing device of the remote host system to determine an updated position of a remote system mouse pointer based at least in part on the local system mouse pointer position information and to provide the updated position of a remote system mouse pointer to the video/graphics circuitry of the remote host system; using the video/graphics circuitry of the remote host system to produce remote system frame buffer information and updated remote system mouse position information representing the updated position of the remote system mouse pointer, and to provide the remote system frame buffer information and updated remote system mouse position information to the second processing device; using the second processing device of the remote host system to provide an updated remote system frame buffer across the network to the local client system, the updated remote system frame buffer including the updated remote system mouse position; and using the local processing device to receive and display updated frame information from the updated remote system frame buffer together with an image of the updated remote system mouse pointer position on the local display device of the local user interface.

In another respect, disclosed herein is an information handling system configured to operate as a remote host system, including: at least one first processing device configured to determine an updated position of a remote system mouse pointer; video/graphics circuitry coupled to the first processing device, the video/graphics circuitry configured to receive the updated position of the remote system mouse pointer from the first processing device and to produce remote system frame buffer information and updated remote system mouse position information representing the updated position of the remote system mouse pointer; and at least one second processing device coupled to the first processing device. The second processing device may be configured to: receive information across a network from a local client system that represents the real time position of a local system mouse pointer, and provide local system mouse pointer position information to the first processing device based on the received information representative of the real time position of the local system mouse pointer. The first processing device may be configured to determine the updated position of the remote system mouse pointer based at least in part on the local system mouse pointer position information. The video/graphics circuitry may be configured to provide the remote system frame buffer information and updated remote system mouse position information to the second processing device. The second processing device may be configured to provide an updated remote system frame buffer across the network to the local client system, the updated remote system frame buffer including the updated remote system mouse position.

DESCRIPTION OF ILLUSTRATIVE EMBODIMENTS

Figure 1:
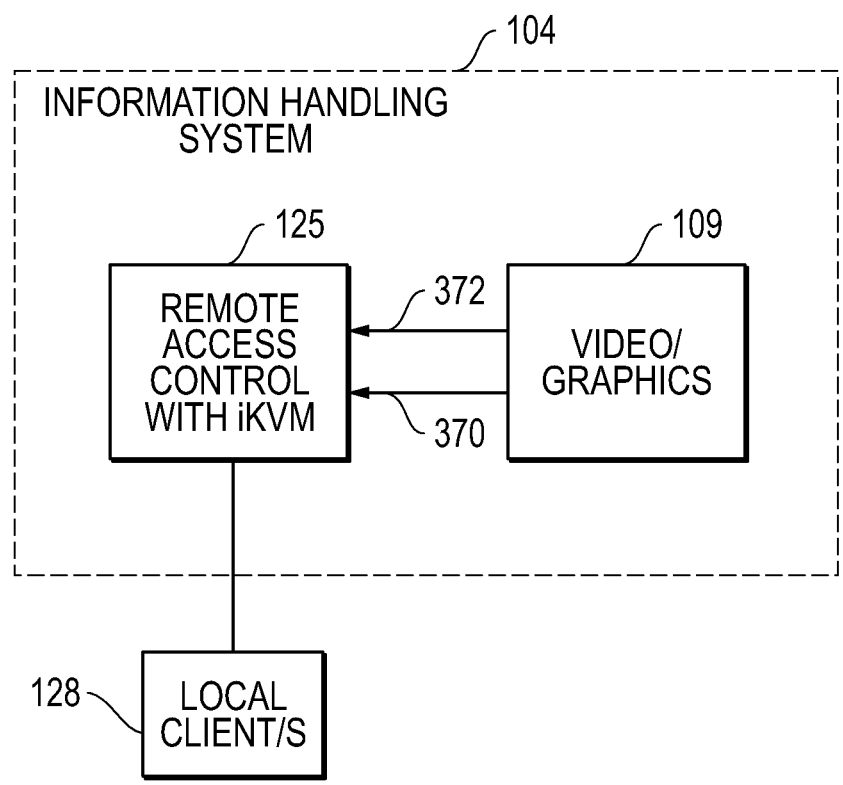
FIG. 1 is a simplified block diagram of a host information handling system and local client information handing systems according to one exemplary embodiment of the disclosed systems and methods.

FIG. 1 shows illustrates a remote host information handling system 104 (e.g., such as one rack mounted server of a multi-server rack system) as it may be configured according to one exemplary embodiment of the disclosed systems and methods. As shown, host information handling system 104 includes a remote access controller 125 implementing a host iKVM manager on host system 104. In one exemplary embodiment, remote access controller 125 may be embedded in the motherboard of information handling system 104. As used herein, the term "embedded" means integrated within the system, subsystem or chassis. Also shown in FIG. 1 are local client/s 128 (e.g., iKVM and/or virtual network computing "VNC" clients) that may be allowed to control position of a remote mouse pointer on remote host information handling system 104 from locations that are remote to host system 104. In one exemplary embodiment, a local client 128 may be a remote administrator (e.g., in the form a data center manager console (DCMC)) that may be a dedicated power IT power console, e.g., running on a server or desktop computer that communicates with information handling system 104 across network.

Still referring to FIG. 1, remote access controller 125 of host system 104 may be coupled as shown to video/graphics circuitry 109 (e.g., video adapter hardware such as graphics card, video card, etc.) to receive mouse pointer position feedback 372 together with remote system frame buffer information 370 from video adapter hardware 109 (e.g., graphics card, video card, etc.) of a remote information handling system so as to facilitate control of the remote mouse pointer by a local user of a given local information handling system client 128 that is communicatively coupled to the remote information handling system across a wired or wireless network.

Figure 2:
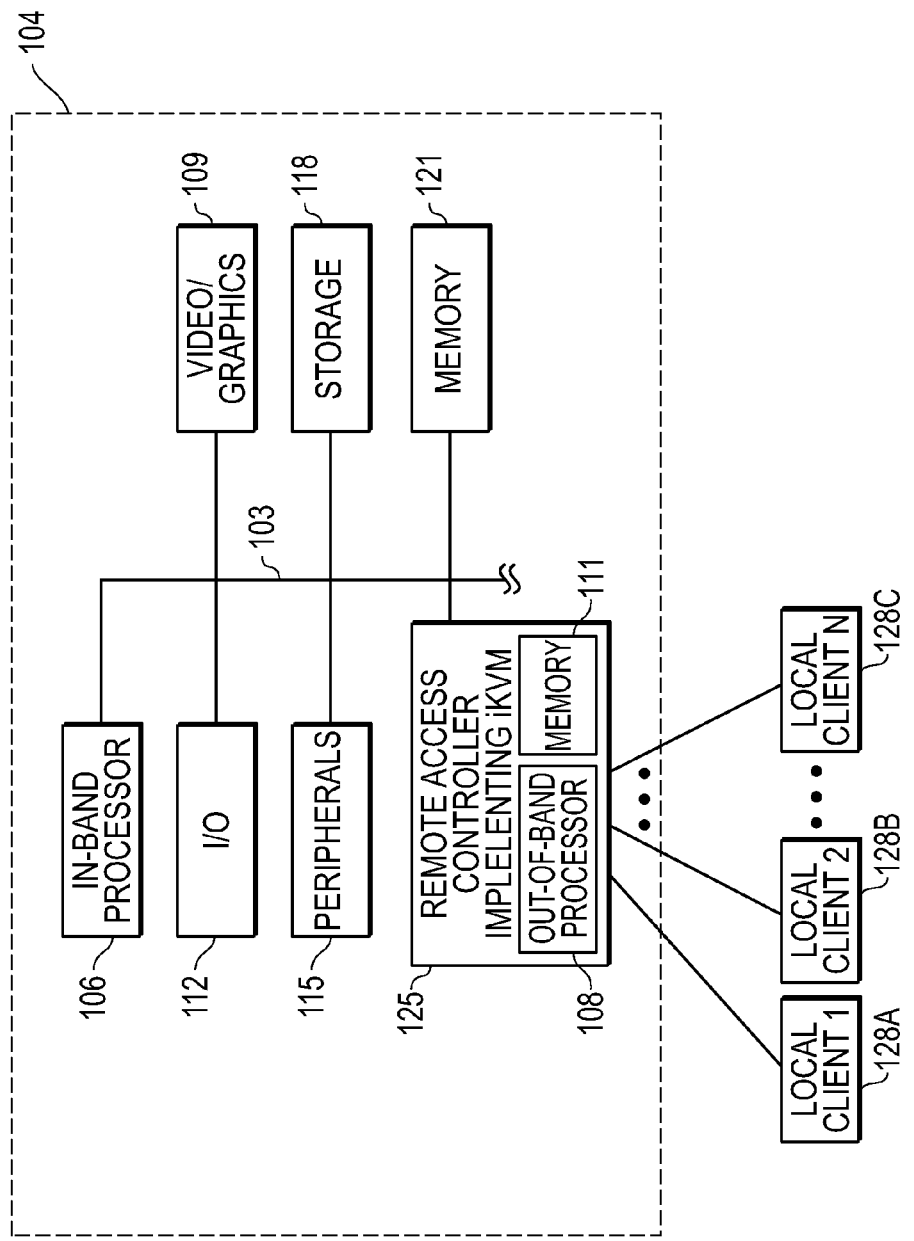
FIG. 2 is a simplified block diagram of a host information handling system and local client information handing systems according to one exemplary embodiment of the disclosed systems and methods.

FIG. 2 is a block diagram of an information handling system 104 as it may be configured according to one exemplary embodiment. As shown, system 104 may include one or more in-band processors 106 (e.g., host CPUs), one or more buses or communication media 103 (with optional associated controller or hub 105), video/graphics circuitry 109, storage 118, memory 121, local input/output (I/O) 112, peripherals 115, and remote access controller 125 having one or more out-of-band processors 108 and memory 111. Bus 103 provides a mechanism for the various components of system 104 to communicate and couple with one another. In-band processor 106 may include a Host processor (e.g., CPU) running a host operating system (OS) such as Windows or Linux-based OS on host system 104, and out-of-band processor 108 may be a service processor, embedded processor, etc. Besides memory 121 (e.g., RAM), processor 106 may include cache memory for storage of frequently accessed data, and storage 118 may include extended memory for processor 106. It will be understood that an out-of-band processing device (e.g., based board management controller, service processor, embedded processor, remote access controller, etc.) may be employed to perform out-of-band operations using one or more out-of-band processing devices that are separate and independent from any in-band host central processing unit (CPU) or other in-band host processing device 106 that runs the host OS of the information handling system, and without management of any application executing with a host OS on the in-band host processing device 106.

It will be understood that the embodiment of FIG. 2 is exemplary only, and that an information handling system may be provided with one or more processing devices that may perform the functions of processor 106, processor 108, remote access controller 125, and other optional processing devices. Examples of such processing devices include, but are not limited to, central processing units (CPUs), embedded controllers, microcontrollers, application specific integrated circuits (ASICs), field programmable gate arrays (FPGAs), etc.

The disclosed systems and methods may be implemented in one exemplary embodiment using a plug-in architecture framework to allow extension of system management functionalities (e.g., using Dell unified server configurator ("USC") server management functionalities available from Dell Products L.P. of Round Rock, Tex.) in a unified extension firmware interface ("UEFI") environment by leveraging available remote access controller core or optional flash memory space. Further information on implementation of USC functionalities in a UEFI environment may be found, for example, in U.S. patent application Ser. No. 12/587,001 filed Sep. 30, 2009, and incorporated herein by reference in its entirety for all purposes. Among other things, the disclosed systems and methods may be implemented to provide a hardware and software interface to allow use of a plug-in framework in the embedded system management that may be run under the BIOS firmware and the UEFI environment. The disclosed systems and methods may also be implemented to provide a USC management architecture that may be modified and enhanced over time, and/or that may also be employed to extend availability of the USC management framework to local clients 128.

Still referring to FIG. 2, remote access controller 125 provides access to a plurality of local clients 128A-128C, although access may be provided to a single user 128 in other embodiments. In this regard, remote access controller 125 may accept mouse pointer position information (e.g., x,y position) from a given local client 128 so as to allow a user of a given local client 128 to employ a local mouse pointing device (e.g., mouse, touchpad, etc.) in order to manage, administer, use, and/or access various resources of host system 104 (e.g., either native or virtual) from a position remote to the host system 104.

In the embodiment of FIG. 2, local clients 128A-128C may have in-band or out-of-band access to system 104 as desired. For example, local clients 128A-128C may have wired and/or wireless access through a local area network (LAN), wide area network (WAN), wireless local area network (WLAN), wireless wide area network (WWAN), dial-up modem, etc. In one embodiment, remote access controller 125 may be an integrated Dell Remote Access Controller (iDRAC) available from Dell Products L.P. of Round Rock, Tex. Further information on such a remote access controller may be found in United States Patent Application Publication Number 2006/0212143 and United States Patent Application Publication Number 2006/0190532, each of which is incorporated herein by reference in its entirety. However, it will be understood that other configuration of remote access controllers may be suitably employed in other embodiments.

Figure 3:
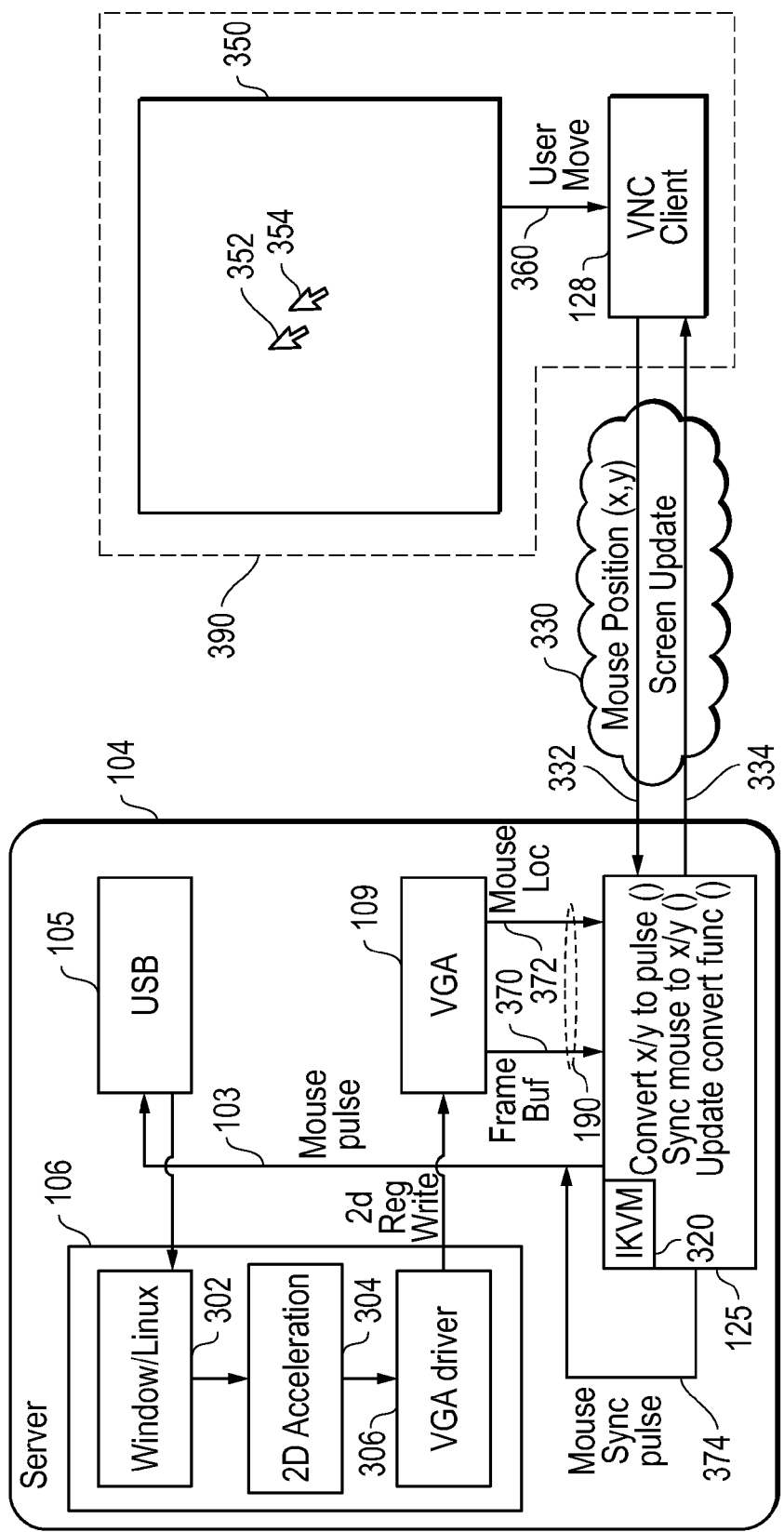
FIG. 3 is a simplified block diagram of a host information handling system and local client information handing system according to one exemplary embodiment of the disclosed systems and methods.

FIG. 3 illustrates one exemplary embodiment of the disclosed systems and methods in which a remote mouse pointer 352 of remote host information handling system 104 is synchronized with a local mouse pointer 354 (e.g., mouse device configured to only provide input data to a processing device of the local system 390) of a local information handling system 390 that are simultaneously displayed with a remote system frame on a local display device (e.g.,. display screen configured to only accept output data from a processing device of the local system 390) of a user interface 350 of local system 390. As shown, user mouse pointer movement information 360 is provided in this exemplary embodiment from a local mouse pointing device (e.g., mouse, touchpad, etc.) of user interface 350 to a VNC client 128 which may be implemented as an application running on a CPU or other in-band processing device of a local information handling system 390. In this regard, a local information handling system 390 may be configured, for example, with similar components as host information system 104 but optionally without the presence of remote access controller 125. In one exemplary embodiment, local client 128 may be implemented on a local information handling system 390 that includes a CPU, chipset, random access memory (RAM), hard disk drive (HDD) storage, video adapter and/or graphics card, one or more network interface cards (NICs), etc. Examples of information handling systems 390 include, but are not limited to, desktop computers, notebook computers, etc.

Still referring to the exemplary embodiment of FIG. 3, remote host system 104 may be communicatively coupled to the remote information handling system across a wired and/or wireless network 330. In this exemplary embodiment, video/graphics circuitry 109 of host system 104 may be configured (e.g., via appropriate circuit configuration and/or firmware configuration) to notify a host iKVM manager 320 (e.g., implemented by remote access controller 125) of 2D, 3D events related to mouse movements. For example, in one exemplary embodiment, the disclosed systems and methods may be implemented using the pre-existing registers of a conventional video card 109 that are configured to be conventionally used by two-dimensional (2D) hardware accelerator application programming interface (API) 304 and OS video drivers 306 (e.g., Windows Drivers or Linux Drivers) to accelerate the display of the remote mouse pointer 352 on a display device. To implement the disclosed systems and methods, video adapter 109 may be configured (e.g., by appropriate video adapter firmware modification) to write the remote pointer position information 372 to an unused section of the remote system frame buffer 370 of the video adapter 109 that is then provided from the video adapter 109 to iKVM manager 320 of controller 125, or alternatively to pass the frame buffer and remote pointer position information 190 information to the iKVM manager 320 by other suitable manner. As shown, this frame buffer and mouse pointer position feedback information 190 is made available to iKVM manager 320 after video adapter (e.g., graphics) processing.

Although USB 103 and USB controller or hub 105 are illustrated and described herein, it will be understood that the host iKVM manager 320 may also emulate the mouse over a serial connection, PS/2, Bluetooth, I/R, Internet Protocol (IP), or any other method of adding a mouse to the system. Additionally, VGA 109 may communicate with host iKVM manager 320 over any suitable communication mechanism (e.g., an additional i2c connection, sending messages on the PCI bus, Bluetooth, Wi-Fi, Ethernet, serial, etc. In one exemplary embodiment, host iKVM manager 320 may be integrated on the same card as VGA 109 in which case, for example, an i2c connection may be used for communications between VGA 109 and host iKVM manager 320, although USB or any other suitable communication medium may be employed.

In one exemplary case of a VNC client 128 implemented with RFC6143 remote frame buffer protocol (RFB), the iKVM manager 320 may use the received remote pointer position information 372 provided together with remote system frame buffer information 370 by video/graphics circuitry 109 to determine the real time difference in position between current actual location/position of remote (e.g., server) mouse 352 and the position of local client mouse 354 communicated in local mouse position information 332 from local client 128. The iKVM manager 320 may then send additional mouse pulses 374 to host (e.g., server) OS 302 via USB 103 and USB controller or hub 105 to correct any determined difference between determined actual positions of remote pointer 352 and local pointer 354 so as to synchronize the two mouse pointer positions. Screen update information 334 including the corrected position of remote mouse 352 may be passed from the iKVM manager 320 to the local VNC client 128 as shown. In a further embodiment, the iKVM manager 320 may be optionally configured to monitor the deviations between local and remote pointers, and to either switch mouse pulse conversion functions and/or update constants related to the current function. In one embodiment, conversion function of X/Y to mouse pulses may be performed by host iKVM manager 320.

Figure 4:
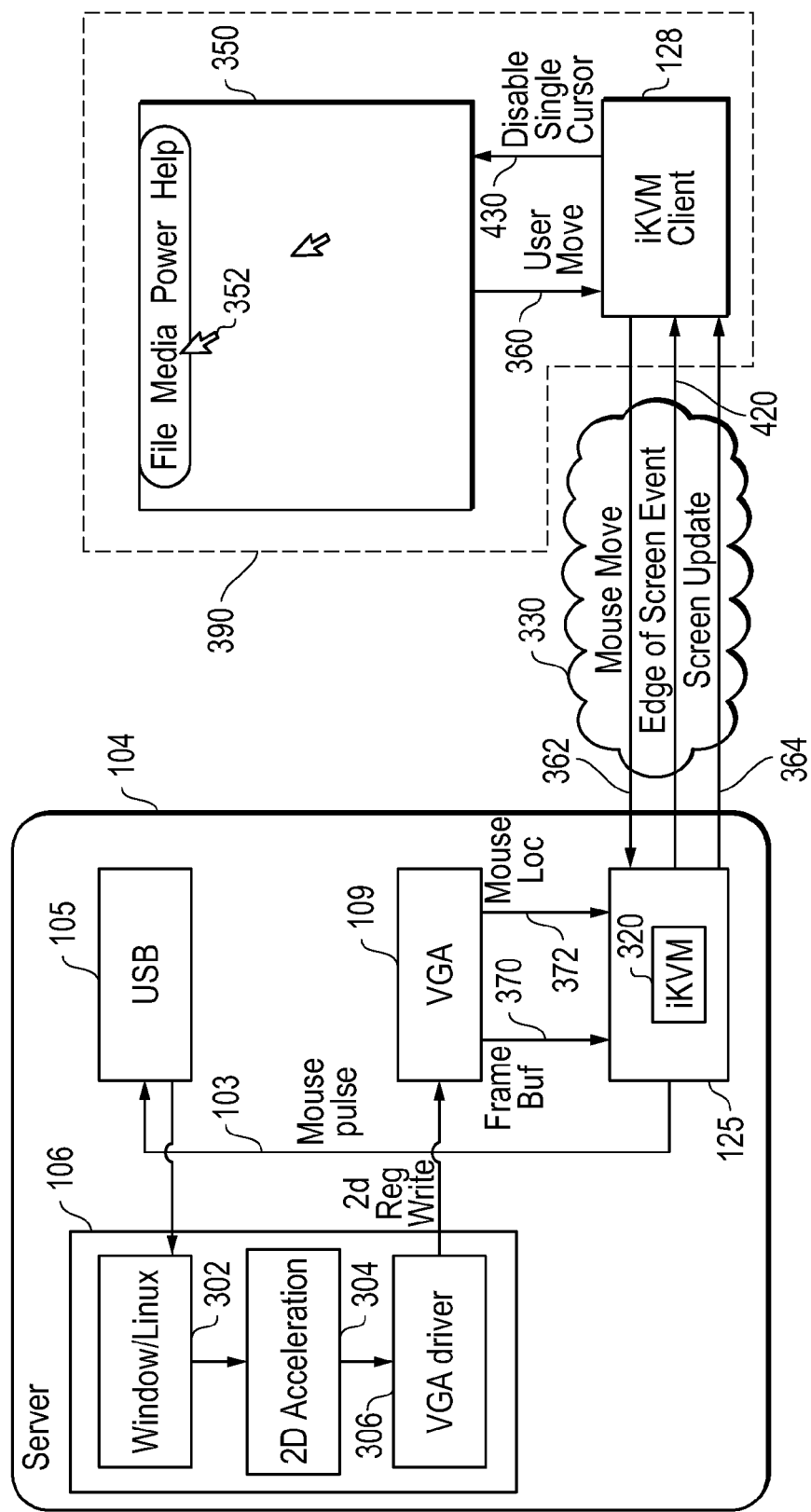
FIG. 4 is a simplified block diagram of a host information handling system and local client information handing system according to one exemplary embodiment of the disclosed systems and methods.

FIG. 4 illustrates another exemplary embodiment of the disclosed systems and methods in which an enhanced single cursor mode may be implemented. In this embodiment, a single cursor mode may be implemented on a local iKVM client 128 which may be implemented as an application running on a CPU or other in-band processing device of a local information handling system 390. The single cursor mode may turn off the user's local mouse 354 and trap focus in a remote desktop window application that is displayed as a remote system frame (e.g., remote monitor screen) on a local display device of a user interface 350 of local system 390 so that only the remote mouse 352 is displayed with the remote system frame (e.g., which in this case is shown as a remote monitor screen including menu bar with "File", "Media", "Power" and "Help" drop down menus in this embodiment). User mouse pointer movement information 360 may be provided as shown from a local mouse pointing device (e.g., mouse, touchpad, etc.) of user interface 350 to a local iKVM client 128. Mouse movement commands 362 may be provided by local iKVM client 128 to a host iKVM manager 320 (e.g., implemented by remote access controller 125) to control movement of the remote mouse 352, and screen update information 364 including the corrected position of remote mouse 352 may be passed from the iKVM manager 320 to the local iKVM client 128 across a wired or wireless network 330 as shown. In this way, the remote mouse 352 is controlled based on the mouse pointer position feedback information received and monitored by the local iKVM client 128 via the screen updates 364 from iKVM manager 320.

Still referring to the embodiment of FIG. 4, host iKVM manager 320 may be configured to monitor the remote pointer position information 372 provided together with remote system frame buffer information 370 by video/graphics circuitry 109 of host system 104 to determine if the local cursor has hit the edge of the remote system monitor frame (e.g., the determined remote mouse pointer position is no longer within the outer peripheral edge of a remote monitor screen of the displayed remote system frame). When an edge event is detected, host iKVM manager 320 may be configured to send an edge of screen event notification 420 to the enhanced iKVM client 128 across network 330. Local iKVM client 128 may be configured to respond to the edge of screen event notification 420 by automatically disabling the single cursor mode and enabling the local mouse pointer 354 as illustrated by video signals 430. Enhanced iKVM client 128 may then track the client mouse position of local mouse pointer 354, and when local mouse pointer 354 moves away from the edge of the remote system frame (e.g., the determined remote mouse pointer position is once again within the outer peripheral edge of a remote monitor screen of the displayed remote system frame), automatically return to the single cursor mode without requiring any manual request or input from the user.

In an alternative embodiment that may be implemented using the architecture of FIG. 4, host iKVM manager 320 may be configured to send screen update information 364 including the corrected position of remote mouse 352 from the iKVM manager 320 to the local iKVM client 128 in the form of separate updated remote mouse pointer position information and frame buffer information as obtained from video adapter hardware circuitry 109. In this embodiment the local iKVM client 128 may be configured to continuously monitor the remote mouse position (i.e., rather than just upon occurrence of an edge of screen event), and may then adjust local mouse pointer movement information 362 it sends back to the host iKVM manager 320 in order to synchronize local and remote mouse pointers. Thus, in this alternate embodiment, conversion function of X/Y to mouse pulses may be performed by local iKVM client 128 to synchronize local and remote mouse pointers.

Figure 5:
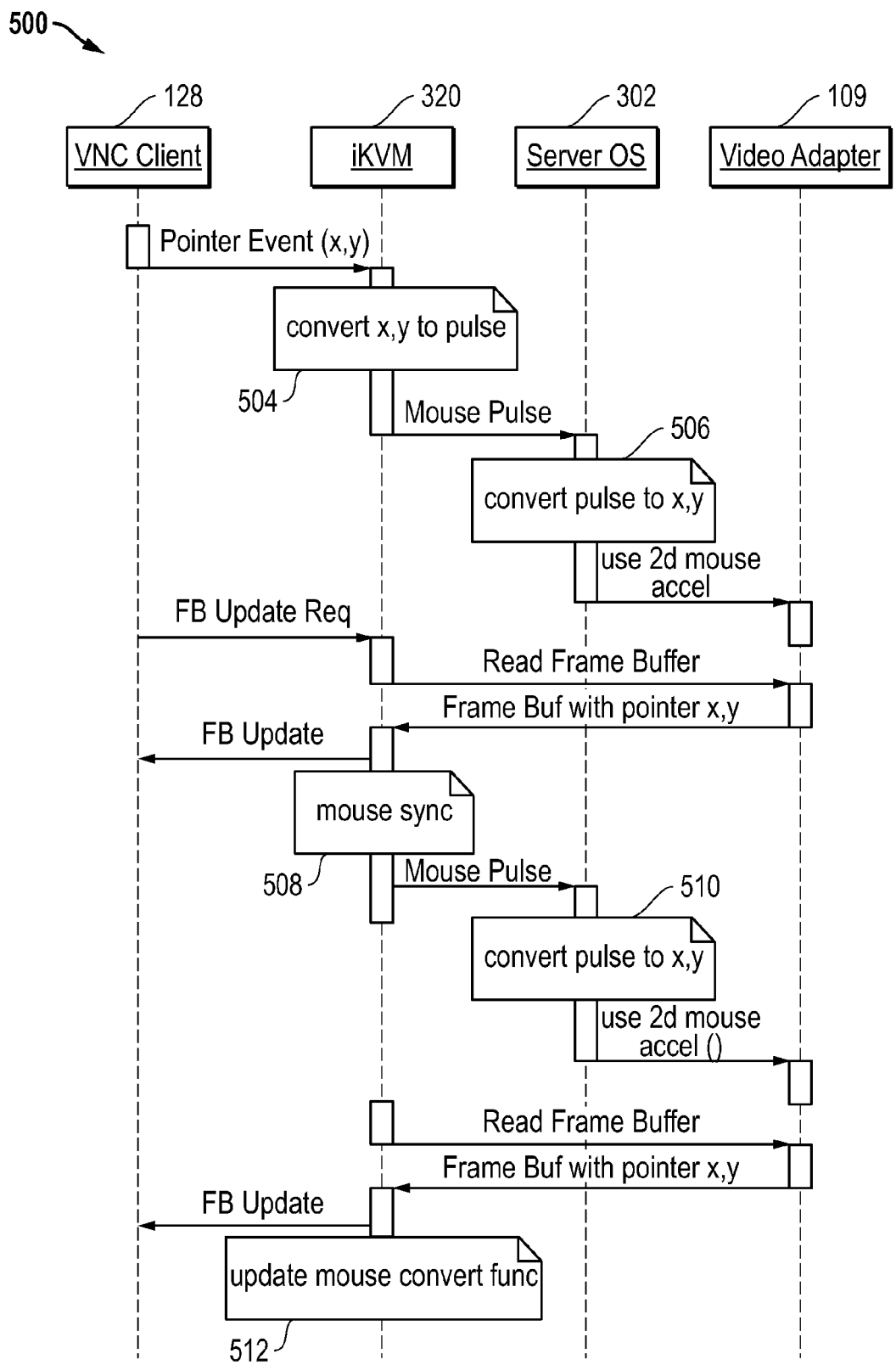
FIG. 5 illustrates a sequence of events for synchronization a remote mouse pointer with a local mouse pointer according to one exemplary embodiment of the disclosed systems and methods.
Figure 6:
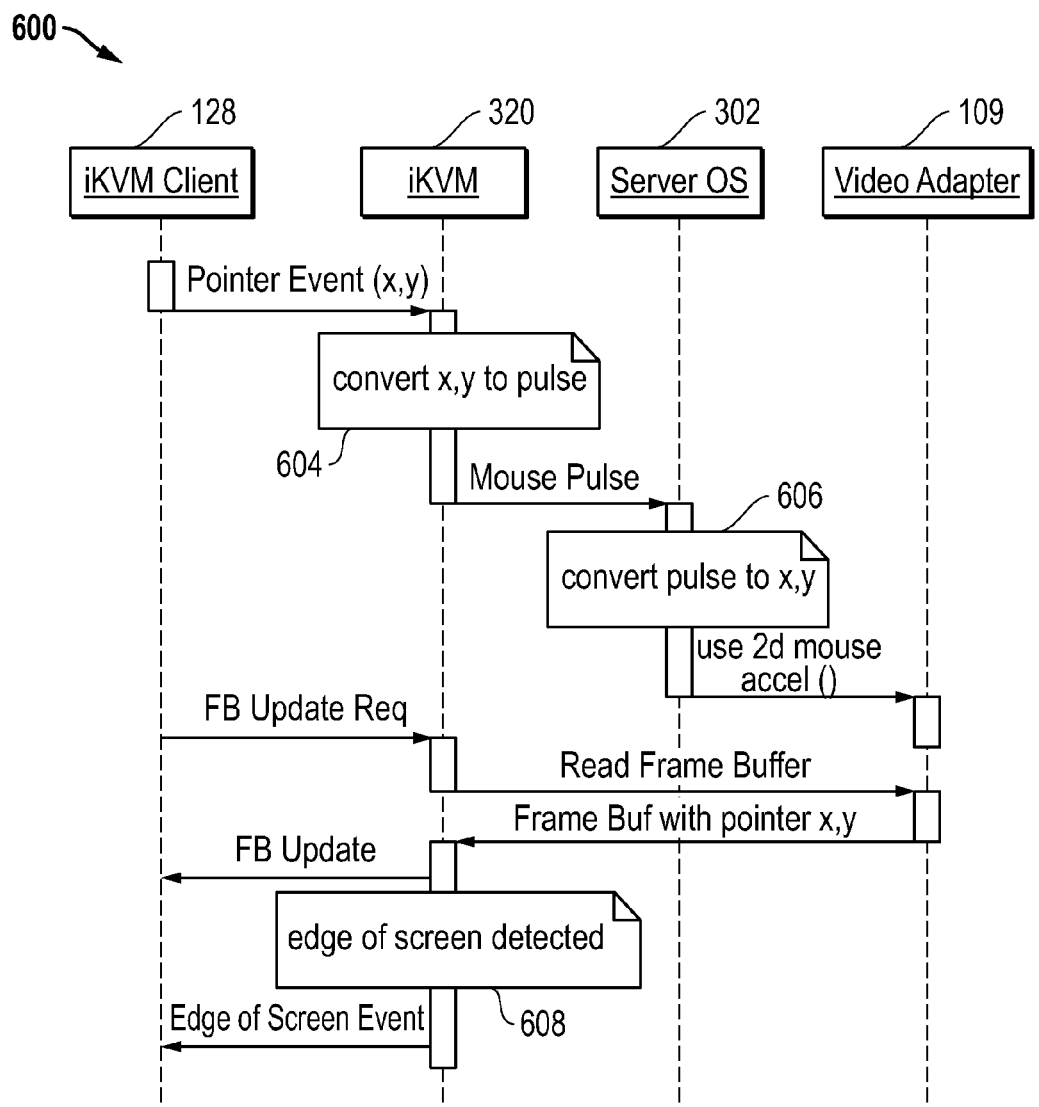
FIG. 6 illustrates a sequence of events for implementation of a single cursor mode according to one exemplary embodiment of the disclosed systems and methods.

FIGS. 5 and 6 illustrate exemplary embodiments of event sequences 500 and 600 that may be implemented to synchronize a remote mouse pointer with a local mouse pointer, and to implement a single cursor mode, respectively. Although described in relation to the embodiment of FIG. 3, it will be understood that the disclosed systems and methods may be implemented to synchronize remote and local mouse pointers, or implement an enhanced single cursor mode, with any other configuration of remote information handling system and local information handling system that are communicatively coupled across a network.

In FIG. 5, sequence of events 500 begins with local iKVM 128 operating in a dual cursor mode in which both remote pointer 354 and local pointer 352 are simultaneously displayed on a local display device of user interface 350 of local system 390. In FIG. 5, dual mode sequence 500 begins with transmission of an x,y mouse pointer movement event in response to user mouse pointer movement information 360 that may be provided in one embodiment from a local mouse pointing device (e.g., mouse, touchpad, etc.) of user interface 350. As illustrated in FIG. 5, transmission of an x,y mouse pointer event is made as local mouse position information 332 from local VNC client 128 to host iKVM manager 320 across network 330.

In step 504, host iKVM manager 320 then converts the received x,y mouse position event information to mouse pulses that represent the new position of the local mouse pointer 354, and then communicates these pulses to host OS 302 across USB 103. In step 506, host OS 302 converts the received mouse pulses to x,y position information that is provided to two-dimensional (2D) hardware accelerator API 304 which performs the operation of combining the 2d mouse cursor sprite with the background into the frame buffer and supplies resulting x,y coordinates of remote mouse 352 to video/graphics circuitry 109 as 2d cursor movements (sprites) via video drivers 306. Separately, local VNC client 128 requests a frame buffer update from host iKVM manager 320 across network 330, which responds by reading remote system frame buffer information 370 together with remote mouse pointer position information 372 from video/graphics circuitry 109.

Host iKVM manager 320 then provides updated remote system frame buffer information that includes the updated remote mouse pointer position information in a frame buffer screen update 334 to local VNC client 128. This updated remote system frame buffer information may, in one embodiment, be provided as a standard FrameBufferUpdate message as defined in Richardson and Levine, "The Remote Framebuffer Protocol," Internet Engineering Task Force (IETF), RealVNC Ltd., March 2011, which is incorporated herein by reference in its entirety. In such a case, the image of the remote mouse pointer is contained in a picture of the remote monitor communicated as the FrameBufferUpdate message.

At the same time, in step 508, host iKVM manager 320 performs mouse synchronization by sending additional mouse pulses for purposes of correcting for any position difference between local mouse pointer 354 and remote mouse pointer 352. In step 510, host OS 302 converts the received mouse pulses to x,y position information that is provided to two-dimensional (2D) hardware accelerator API 304 which performs the operation of combining the 2d mouse cursor sprite with the background into the frame buffer and supplies resulting x,y coordinates of remote mouse 352 to video/graphics circuitry 109 as 2d cursor movements (sprites) via video drivers 306. The corrected x,y remote position information is then provided to hardware accelerator API 304 which supplies resulting corrected x,y coordinates of remote mouse 352 to video/graphics circuitry 109 via video drivers 306 which updates remote mouse position relative to the current remote system frame buffer. This remote mouse correction process may be iteratively repeated until remote mouse 352 converges in position with local mouse 354 (e.g., converges to the same position).

Still referring to FIG. 5, after one or more iterations of step 508, host iKVM manager 320 may read remote system frame buffer information 370 together with updated mouse pointer information 372 and in step 512 may update the mouse convert function 504 which dictates how many mouse pulses are sent and at what rate in response to pointer event that changes the x,y position of the local cursor. At this time, host iKVM manager 320 may provide updated remote system frame buffer information as a remote system frame buffer screen update 334 to local VNC client 128 as shown, which depicts the image of the remote mouse pointer contained in a picture of the remote monitor (e.g., remote frame or screen). However, in this embodiment frame buffer update 334 sent to the VNC client 128 does not contain an "unused" section of the frame buffer that has remote mouse pointer x,y information as provided by video/graphics circuitry 109.

As described above, the embodiment of FIG. 5 may be implemented with a standard VNC client 128, it being understood that the host iKVM manager 320 performs the task of converting an absolute X/Y mouse position into mouse ticks. Thus, in this embodiment host iKVM manager 320 is aware of the mouse acceleration on remote system 104 because the conversion changes depend on how fast it sends the pulses in real time. This conversion function is not linear, it changes at different thresholds, and these thresholds are different between different operating systems and user configurations. If there are lots of misses detected in step 508 the profile may be changed, and over time more data can be collected and a fit can be done against that data.

In FIG. 6, sequence of events 600 begins with local iKVM 128 operating in a single cursor mode in which only remote cursor 352 is displayed on displayed on local display device of user interface 350 of local system 390. In FIG. 6, single cursor mode sequence 600 begins with transmission of an x,y mouse pointer movement event in response to user mouse pointer movement information 360 that is provided in one exemplary embodiment from a local mouse pointing device (e.g., mouse, touchpad, etc.) of user interface 350. As shown, transmission of the x,y mouse pointer movement event is made as local mouse position information 362 from local iKVM client 128 to host iKVM manager 320 across network 330. In step 604, host iKVM manager 320 then converts the x,y position information to mouse pulses that represent the new position for the remote mouse pointer 352, and then communicates these pulses to host OS 302 across USB 103. In step 606, host OS 302 converts the received mouse pulses to x,y position information that is provided to hardware accelerator API 304 which performs the operation of combining the 2d mouse cursor sprite with the background into the frame buffer and supplies resulting x,y coordinates of remote mouse 352 to video/graphics circuitry 109 via video drivers 306.

Separately, local iKVM client 128 requests a frame buffer update from host iKVM manager 320 across network 330, which responds by reading remote system frame buffer information 370 together with remote mouse pointer position information 372 from video/graphics circuitry 109. Host iKVM manager 320 then provides updated frame buffer information as a remote system frame buffer screen update 364 to local iKVM client 128. As before, this updated remote system frame buffer information may, in one embodiment, may be provided as a standard FrameBufferUpdate message as defined in Richardson and Levine, "The Remote Framebuffer Protocol," Internet Engineering Task Force (IETF), RealVNC Ltd., March 2011, which is incorporated herein by reference in its entirety. In such a case, the image of the remote mouse pointer is contained in a picture of the remote monitor communicated as the FrameBufferUpdate message. At the same time, in step 608, host iKVM manager 320 determines if the updated position of single cursor remote mouse pointer 352 has hit the edge of the updated remote system frame and, if so, transmits an edge of screen notification signal 420 across network 330 to local iKVM client 128.

Alternatively, as described before, host iKVM manager 320 may send screen update information 364 including the corrected position of remote mouse 352 from the iKVM manager 320 to the local iKVM client 128 in the form of separate updated remote mouse pointer position information and frame buffer information as obtained from video adapter hardware circuitry 109, and local iKVM client 128 may then adjust local mouse pointer movement information 362 it sends back to the host iKVM manager 320 in order to synchronize local and remote mouse pointers.

It will be understood that one or more of the tasks, functions, or methodologies described herein (e.g., including those performed by host iKVM manager 320, local VNC client 128 and/or local iKVM client 128) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform one or more steps of the methodologies disclosed herein. A computer program of instructions may be stored in or on the non-transitory computer-readable medium residing on or accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A system of multiple information handling systems, comprising:
    at least one first information handling system configured to operate as a remote host system that comprises:
        at least one first processing device configured to execute a host operating system (OS) and to determine an updated absolute X/Y position of a remote system mouse pointer from mouse pulses,
        a video adapter (VGA) that is coupled to the first processing device of the remote host system to receive the updated absolute X/Y position of the remote system mouse pointer from the first processing device of the remote host system and to produce remote system frame buffer information and updated remote system mouse position information as mouse pointer position feedback representing the updated absolute X/Y position of the remote system mouse pointer that is determined by the host OS and received from the first processing device of the remote host system, and at least one second and different processing device embedded within the remote host system and that is coupled between a local client system and the first processing device and that is coupled between the local client system and the VGA, the second processing device of the remote host system being directly coupled to the VGA to receive both the remote system frame buffer information and updated remote system mouse position information from the VGA; and at least one second information handling system comprising a local processing device and coupled as the local client system to the first information handling system across a network to receive updated frame information from an updated remote system frame buffer together with an image of the updated remote system mouse pointer position representing the updated absolute X/Y position of the remote system mouse pointer on a local display device of the local user interface;

where the second processing device of the remote host system is configured to receive X/Y information across the network from the local processing device of the local client system that represents the real time X/Y position of a local system mouse pointer, to convert changes in the received real time X/Y position of the local system mouse pointer to mouse pulses, and to provide local system mouse pointer position information as the mouse pulses to the host OS executed by the first processing device of the remote host system.

2. The system of claim 1, where the first processing device of the remote host system comprises a central processing unit (CPU) configured to execute the host operating system (OS); where the VGA comprises a VGA card; and where the second processing device of the remote host system comprises a remote access controller configured to execute a host iKVM manager to:

receive the X/Y information across a network from the local client system that represents the real time X/Y position of the local system mouse pointer;

convert changes in the received real time X/Y position of the local system mouse pointer to mouse pulses;

provide the local system mouse pointer position information as the mouse pulses to the host OS executed by the first processing device of the remote host system based on the received information representative of the real time position of the local system mouse pointer; and provide updated remote system frame buffer information including the updated remote system mouse position representing the updated absolute X/Y position of the remote system mouse pointer across the network to the local client system.

3. The system of claim 1, where the local client system comprises a local user interface that includes at least one local display device and at least one local mouse pointing device coupled to the local processing device; where the at least one local processing device of the local client system is configured to accept local mouse pointer position input from a user of the local mouse pointing device to change the real time position of a local mouse pointer; where the second processing device of the remote host system is further configured to correct for any determined real time difference in position between the real time local system mouse pointer position and the real time remote mouse pointer position, and to provide corrected mouse pointer position information to the first processing device of the remote host system; where the first processing device of the remote host system is further configured to determine the updated absolute X/Y position of the remote system mouse pointer based at least in part on the corrected mouse pointer position information; and where the local processing device is configured to receive and display a remote system frame from the updated remote system frame buffer together with both the local mouse pointer position and an image of the updated remote system mouse pointer position representing the updated absolute X/Y position of the remote system mouse pointer on the local display device of the local user interface.

4. The system of claim 3, where the first and second processing devices of the remote host system are further configured to synchronize a real time position of the local system mouse pointer with a real time position of the remote system mouse pointer by iteratively correcting for any determined real time difference in position between the real time local system mouse pointer position and the real time remote mouse pointer position, and then determining the updated position of the remote system mouse pointer based at least in part on the corrected mouse pointer position information until the real time position of the remote system mouse pointer converges to substantially the same position as the real time position of the local system mouse pointer; and where the local processing device is configured to receive and display a remote system frame from the updated remote system frame buffer together with both the local mouse pointer position and an image of the updated remote system mouse pointer position representing the updated absolute X/Y position of the remote system mouse pointer on the local display device of the local user interface.

5. The system of claim 1, where the local client system comprises a local user interface that includes at least one local display device and at least one local mouse pointing device coupled to the local processing device; where the at least one local processing device of the local client system is configured to accept local mouse pointer position input from a user of the local mouse pointing device to change the real time position of a local mouse pointer; where the updated remote system frame buffer includes a remote system frame having an outer peripheral edge; and where the second processing device of the remote host system is further configured to determine if the updated remote system mouse position representing the updated absolute X/Y position of the remote system mouse pointer is within the outer peripheral edge of the remote system frame, and to provide a signal to notify the local processing device of the local client system of whether or not the updated remote system mouse position is within the outer peripheral edge of the remote system frame;

where the local processing device of the local client system is further configured to display only an image of the remote mouse pointer position representing the updated absolute X/Y position of the remote system mouse pointer on the local display device of the local user interface when the remote system mouse position is determined to be within the outer peripheral edge of the remote system frame; and where the local processing device of the local client system is further configured to display only an image of the local mouse pointer position on the local display device of the local user interface when the signal from the second processing device indicates that the updated remote system mouse position representing the updated absolute X/Y position of the remote system mouse pointer is not within the outer peripheral edge of the remote system frame.

6. The system of claim 1, where the first processing device of the remote host system is configured to use two-dimensional (2D) hardware acceleration and the updated X/Y position information to provide the updated absolute X/Y position of the remote system mouse pointer from the first processing device to the VGA of the remote host system.

7. A method of operating multiple information handling systems, comprising:
   providing at least one first information handling system as a remote host system comprising:
      at least one first processing device,
      a video adapter (VGA) that is coupled to the first processing device, and
      at least one second processing device embedded within the remote host system and that is coupled to the first processing device and that is directly coupled to the VGA to receive both remote system frame buffer information and updated remote system mouse position information from the VGA; and
   providing at least one second information handling system as a local client system coupled to the first information handling system across a network such that the second processing device of the remote host system is coupled between the local client system and the first processing device and is also coupled between the local client system and the VGA, the second information handling system including:
      a local user interface including at least one local display device and at least one local mouse pointing device coupled to the local processing device, and
      at least one local processing device;
   using the local processing device of the local client system to accept local mouse pointer position input from a user of the local mouse pointing device, change the real time position of a local mouse pointer based on the local mouse pointer position input, and provide X/Y information across the network to the second processing device of the remote host system that represents the real time X/Y position of the local system mouse pointer;
   using the second processing device of the remote host system to receive the information across the network from the local processing device of the local client system that represents the real time X/Y position of the local system mouse pointer, to convert changes in the received real time X/Y position of the local system mouse pointer to mouse pulses, and to provide local system mouse pointer position information as the mouse pulses to a host operating system (OS) executing on the first processing device of the remote host system;
   using the first processing device of the remote host system to execute the host operating system (OS) and to determine an updated absolute X/Y position of a remote system mouse pointer from the mouse pulses;
   using the VGA of the remote host system to produce the remote system frame buffer information and the updated remote system mouse position information representing the updated absolute X/Y position of the remote system mouse pointer, and to provide the remote system frame buffer information and updated remote system mouse position information as mouse pointer position feedback representing the updated absolute X/Y position of the remote system mouse pointer to the second processing device of the remote host system;
   using the second processing device of the remote host system to provide an updated remote system frame buffer across the network to the local processing device of the local client system, the updated remote system frame buffer including the updated remote system mouse position of the mouse pointer position feedback representing the updated absolute X/Y position of the remote system mouse pointer; and
   using the local processing device of the local client system to receive and display updated frame information from the updated remote system frame buffer together with an image of the updated remote system mouse pointer position representing the updated absolute X/Y position of the remote system mouse pointer on the local display device of the local user interface.

8. The method of claim 7, where the first processing device of the remote host system comprises a central processing unit (CPU) configured to execute the host OS, where the VGA comprises a VGA card, and where the second processing device of the remote host system comprises a remote access controller; and where the method further comprises:
   executing a host operating system (OS) on the CPU; and
   executing a host iKVM manager on the remote access controller to:
      receive the X/Y information across a network from the local client system that represents the real time X/Y position of the local system mouse pointer,
      convert changes in the received real time X/Y position of the local system mouse pointer to mouse pulses,
      provide the local system mouse pointer position information as the mouse pulses to the host OS executing on the first processing device of the remote host system based on the received information representative of the real time position of the local system mouse pointer, and
      provide the updated remote system frame buffer information including the updated remote system mouse position representing the updated absolute X/Y position of the remote system mouse pointer across the network to the local client system.

9. The method of claim 7, further comprising:
   using the second processing device of the remote host system to correct for any determined real time difference in position between the real time local system mouse pointer position and the real time remote mouse pointer position, and to provide corrected mouse pointer position information to the first processing device of the remote host system;
   using the first processing device of the remote host system to determine the updated absolute X/Y position of the remote system mouse pointer based at least in part on the corrected mouse pointer position information; and
   using the local processing device of the local client system to receive and display a remote system frame from the updated remote system frame buffer together with both the local mouse pointer position and an image of the updated remote system mouse pointer position representing the updated absolute X/Y position of the remote system mouse pointer on the local display device of the local user interface.

10. The system of claim 9, further comprising using the first and second processing devices of the remote host system to synchronize a real time position of the local system mouse pointer with a real time position of the remote system mouse pointer by:
   iteratively correcting for any determined real time difference in position between the real time local system mouse pointer position and the real time remote mouse pointer position, and then determining the updated position of the remote system mouse pointer based at least in part on the corrected mouse pointer position information until the real time position of the remote system mouse pointer converges to substantially the same position as the real time position of the local system mouse pointer; and using the local processing device of the local client system to receive and display a remote system frame from the updated remote system frame buffer together with both the local mouse pointer position and an image of the updated remote system mouse pointer position representing the updated absolute X/Y position of the remote system mouse pointer on the local display device of the local user interface.

11. The system of claim 7, where the updated remote system frame buffer includes a remote system frame having an outer peripheral edge; and where the method further comprises:

using the second processing device of the remote host system to determine if the updated remote system mouse position representing the updated absolute X/Y position of the remote system mouse pointer is within the outer peripheral edge of the remote system frame, and to provide a signal across the network to notify the local processing device of the local client system of whether or not the updated remote system mouse position is within the outer peripheral edge of the remote system frame;

using the local processing device to display only an image of the remote mouse pointer position representing the updated absolute X/Y position of the remote system mouse pointer on the local display device of the local user interface when the remote system mouse position is determined to be within the outer peripheral edge of the remote system frame; and using the local processing device to display only an image of the local mouse pointer position on the local display device of the local user interface when the signal from the second processing device indicates that the updated remote system mouse position representing the updated absolute X/Y position of the remote system mouse pointer is not within the outer peripheral edge of the remote system frame.

12. The method of claim 7, further comprising using the first processing device to execute a 2D hardware acceleration application programming interface (API) to convert the updated X/Y position information for the remote system mouse pointer from the host OS to the updated absolute X/Y position of the remote system mouse pointer.

13. The method of claim 12, further comprising using the first processing device to execute a VGA driver; and to provide the updated absolute X/Y position of the remote system mouse pointer from the first processing device to the VGA via the VGA driver.

14. The method of claim 13, where the VGA is a VGA card having registers; and where the method further comprises using the first processing device to execute the 2D hardware acceleration API and VGA driver to use the registers of the VGA to accelerate the display of the remote mouse pointer.

15. The method of claim 13, further comprising using the second processing device of the remote host system to provide the local system mouse pointer position information as the mouse pulses to the host OS executing on the first processing device of the remote host system; and using the first processing device to:

execute the host OS to convert the provided mouse pulses to the updated X/Y position information;

execute the 2D hardware accelerator API to use the X/Y position information to combine a 2D mouse cursor sprite with a background into the remote system frame buffer information; and provide the updated absolute X/Y position of the remote system mouse pointer to the VGA as 2D cursor sprites via the VGA driver.

16. The method of claim 7, further comprising using the VGA on the remote host system to receive the updated absolute X/Y position of the remote system mouse pointer from the first processing device before using the VGA to provide the remote system frame buffer information and updated remote system mouse position information to the second processing device.

17. The method of claim 7, further comprising using the first processing device of the remote host system to convert the provided mouse pulses to updated X/Y position information of a remote system mouse pointer and to use two-dimensional (2D) hardware acceleration and the updated X/Y position information to provide the updated absolute X/Y position of a remote system mouse pointer to the VGA of the remote host system.

18. An information handling system configured to operate as a remote host system, comprising:

at least one first processing device configured to execute a host operating system (OS) and to determine an updated absolute X/Y position of a remote system mouse pointer from mouse pulses;

a video adapter (VGA) that is coupled to the first processing device to receive the updated absolute X/Y position of the remote system mouse pointer from the first processing device and to produce remote system frame buffer information and updated remote system mouse position information representing the updated absolute X/Y position of the remote system mouse pointer that is determined by the host OS and received from the first processing device; and at least one second processing device embedded within the remote host system and configured to be coupled between a local client system and the first processing device and coupled between the local client system and the VGA, the second processing device being directly coupled to the VGA to receive both the remote system frame buffer information and updated remote system mouse position information from the VGA;

where the second processing device of the remote host system is configured to:

receive X/Y information across a network from a local client system that represents the real time X/Y position of a local system mouse pointer, convert changes in the received real time X/Y position of the local system mouse pointer to mouse pulses, and provide local system mouse pointer position information as the mouse pulses to the host OS executed by the first processing device.

19. The system of claim 18, where the first processing device comprises an in-band host processing device; and where the second processing device comprises an out-of-band processing device.

20. The system of claim 18, where the first processing device comprises a central processing unit (CPU) configured to execute the host operating system (OS); where the VGA comprises a VGA card; and where the second processing device comprises a remote access controller configured to execute a host iKVM manager to:

receive the X/Y information across a network from a local client system that represents the real time X/Y position of a local system mouse pointer;

convert changes in the received real time X/Y position of the local system mouse pointer to mouse pulses;

provide the local system mouse pointer position information as the mouse pulses to the host OS executed by the first processing device based on the received information representative of the real time position of the local system mouse pointer; and provide updated remote system frame buffer information with the updated remote system mouse position representing the updated absolute X/Y position of the remote system mouse pointer across the network to the local client system.

21. The system of claim 18, where the second processing device is further configured to correct for any determined real time difference in position between the real time local system mouse pointer position and the real time remote mouse pointer position, and to provide corrected mouse pointer position information to the first processing device; and where the first processing device is configured to determine the updated absolute X/Y position of the remote system mouse pointer based at least in part on the corrected mouse pointer position information.

22. The system of claim 21, where the first and second processing devices are configured to synchronize a real time position of the local system mouse pointer with a real time position of the remote system mouse pointer by iteratively correcting for any determined real time difference in position between the real time local system mouse pointer position and the real time remote mouse pointer position, and then determining the updated position of the remote system mouse pointer based at least in part on the corrected mouse pointer position information until the real time position of the remote system mouse pointer converges to substantially the same position as the real time position of the local system mouse pointer.

23. The system of claim 18, where the updated remote system frame buffer includes a remote system frame having an outer peripheral edge; and where the second processing device is configured to:

determine if the updated remote system mouse position representing the updated absolute X/Y position of the remote system mouse pointer is within the outer peripheral edge of the remote system frame; and provide a signal to notify the local client system of whether or not the updated remote system mouse position representing the updated absolute X/Y position of the remote system mouse pointer is within the outer peripheral edge of the remote system frame.

24. The system of claim 18, where the remote host system is a server system configured for rack mounting and operation.

25. The system of claim 18, where the first processing device is further configured to execute a 2D hardware acceleration application programming interface (API) to convert the updated X/Y position information for the remote system mouse pointer from the host OS to the updated absolute X/Y position of the remote system mouse pointer.

26. The system of claim 25, where the first processing device is further configured to execute a VGA driver; and to provide the updated absolute X/Y position of the remote system mouse pointer from the first processing device to the VGA via the VGA driver.

27. The system of claim 26, where the VGA is a VGA card having registers; and where the first processing device is configured to execute the 2D hardware acceleration API and VGA driver to use the registers of the VGA to accelerate the display of the remote mouse pointer.

28. The system of claim 26, where the second processing device of the remote host system is further configured to provide the local system mouse pointer position information as the mouse pulses to the host OS executed on the first processing device of the remote host system; and where the first processing device is configured to:

execute the host OS to convert the provided mouse pulses to the X/Y position information;

execute the 2D hardware accelerator API to use the X/Y position information to combine a 2D mouse cursor sprite with a background into the remote system frame buffer information; and provide the updated absolute X/Y position of the remote system mouse pointer to the VGA as 2D cursor sprites via the VGA driver.

29. The system of claim 18, where the VGA on the remote system is coupled to receive the updated absolute X/Y position of the remote system mouse pointer from the first processing device before providing the remote system frame buffer information and updated remote system mouse position information to the second processing device.

\* \* \* \* \*